US007015597B2

(12) United States Patent
Colby et al.

(10) Patent No.: US 7,015,597 B2
(45) Date of Patent: Mar. 21, 2006

(54) POWER REGULATOR FOR POWER INVERTER

(75) Inventors: Roy Stephen Colby, Raleigh, NC (US);
Mark John Kocher, Raleigh, NC (US);
Gerald Benjamin Carson, Raleigh, NC (US)

(73) Assignee: Square D Company, Palatine, IL (US)

( * ) Notice: Subject to any disclaimer, the term of this patent is extended or adjusted under 35 U.S.C. 154(b) by 286 days.

(21) Appl. No.: 10/662,004

(22) Filed: Sep. 11, 2003

(65) Prior Publication Data

US 2005/0057950 A1 Mar. 17, 2005

(51) Int. Cl.
*H02J 3/16* (2006.01)

(52) U.S. Cl. .............................. 307/31; 307/51; 307/87; 322/20; 324/76.74; 702/60; 702/65

(58) Field of Classification Search .................. 307/31, 307/51, 87; 322/20; 324/76.74; 702/60, 702/65

See application file for complete search history.

(56) References Cited

U.S. PATENT DOCUMENTS

| | | | |
|---|---|---|---|
| 4,251,735 A | 2/1981 | Coleman | |
| 4,445,049 A | 4/1984 | Steigerwald | |
| 4,819,121 A | 4/1989 | Saito et al. | |
| 4,878,208 A | 10/1989 | Seki et al. | |
| 5,111,377 A | 5/1992 | Higasa et al. | |
| 5,162,964 A | 11/1992 | Higasa et al. | |
| 5,255,176 A | 10/1993 | Hatta et al. | |
| 5,327,336 A | 7/1994 | Ohkubo et al. | |
| 5,373,194 A | 12/1994 | Nakamura | |
| 5,493,485 A | 2/1996 | Okado | |
| 5,686,766 A | 11/1997 | Tamechika | |
| 6,172,889 B1 | 1/2001 | Eguchi et al. | |
| 6,219,623 B1 * | 4/2001 | Wills | 702/60 |
| 6,429,546 B1 | 8/2002 | Ropp et al. | |
| 6,456,056 B1 | 9/2002 | Katoh et al. | |
| 6,603,290 B1 | 8/2003 | Hochgraf | |
| 6,810,339 B1 * | 10/2004 | Wills | 702/65 |
| 6,815,932 B1 * | 11/2004 | Wall | 322/20 |
| 6,853,940 B1 * | 2/2005 | Tuladhar | 702/111 |
| 2001/0056330 A1 | 12/2001 | Wills | |
| 2002/0047699 A1 | 4/2002 | Katoh et al. | |
| 2002/0060556 A1 | 5/2002 | Wall | |
| 2003/0080741 A1 | 5/2003 | LeRow et al. | |
| 2003/0098671 A1 | 5/2003 | Hochgraf | |

OTHER PUBLICATIONS

IEA International Energy Agency; Photovoltaic Power Systems Programme; Task V; Report IEA-PVPS T5-09: 2002: Mar. 2002; Evaluation of Islanding Detection Methods for Photovoltaic Utility-Interactive Power Systems.

* cited by examiner

*Primary Examiner*—Gary L Laxton (57) ABSTRACT

A power inverter includes a regulator circuit that controls real and reactive power output by the inverter. The regulator measures real and reactive output power by calculating x-phasor components of the inverter's voltage and current output waveforms. Phasor calculation can be adapted for one or more pairs of single-phase voltages and currents. Determining the fundamental in-phase and quadrature components of output voltage and current reduces computational complexity by permitting the regulator to perform its power control processing largely in a dc signal domain, and enables separate real and reactive power control. The power inverter can include islanding detection logic, which exploits the ability to separately control reactive power. Exemplary islanding detection logic is based on determining whether changing the amount of reactive power output by the inverter induces an output frequency shift.

36 Claims, 9 Drawing Sheets

POWER REGULATOR FOR POWER INVERTER

BACKGROUND OF THE INVENTION

The present invention generally relates to ac power control, and particularly relates to power regulation for ac power inverters.

Increasing use of localized power sources in residential and industrial settings coincides with the increasing desire to exploit potentially cheaper, cleaner, or more reliable alternative energy sources. Historically, individuals and businesses relied on central generation stations with power transmission and distribution networks, i.e., the traditional "grid," almost exclusively but the developing trend is toward a number of smaller generating units, distributed geographically close to the loads. Local power generation using power sources such as photovoltaic systems, fuel cells, etc., also is becoming a viable option for businesses and homeowners. These local power generating systems can be configured as stand-alone systems that operate as the exclusive source of power for their local loads or they can be interconnected with the grid.

More commonly, these local power generating systems are configured as grid-connected systems that provide an opportunity for co-generation wherein power can be taken from the grid or provided to the grid. A grid-connected system allows a local load to remain connected both to the local system and to the power grid. In a typical setup, a local load is connected in parallel to an ac power inverter and to a utility grid. The load can be powered solely by the inverter, by the grid, or can receive a portion of its power from both.

Grid-connected inverters pose certain hazards, with undetected islanding standing as a primary hazard. With islanding, a portion of the utility grid becomes disconnected from or otherwise isolated from the rest of the grid but remains energized at potentially hazardous levels because of its connection to one or more local power inverters. Unless the connected power inverters recognize the islanding condition, the isolated portion of the grid remains energized even if other parts of the grid are de-energized, creating a potentially hazardous condition for service personnel and others.

SUMMARY OF THE INVENTION

The present invention comprises a method and apparatus to regulate a power inverter. In an exemplary embodiment, a method of controlling the real and reactive power output by the inverter comprises calculating x-y phasor components of inverter output current and voltage referenced to a desired x-y coordinate frame and measuring real and reactive power output by the inverter based on the calculated x-y phasor components. The inverter's output current and voltage thus are indirectly adjusted by reducing a difference between the measured and desired real powers and the measured and desired reactive powers. Calculation of the x-y phasor components can be based on integrating over half-cycles of the voltage and current waveforms for single-phase inverter applications.

An exemplary inverter can operate as a stand-alone inverter or it can be connected to other equipment, such as a power distribution grid. If connected to an external power system, e.g., a utility grid, the inverter can reference its x-y coordinate frame to a signal phase of the external system. For example, the inverter can reference its in-phase (x) coordinate to the voltage phase of the utility grid, such that its determination of in-phase (real) and quadrature (reactive) components is accurately referenced to real power in the grid. If the grid is disconnected or outside of nominal conditions, the inverter can use an internal reference for determining its x-y coordinate frame.

An exemplary regulator circuit for inverter control can be implemented in hardware, software, or both, and can include a measurement circuit to measure real and reactive power output by the inverter based on calculating x-y phasor components of inverter output current and voltage referenced to a desired x-y coordinate frame, and a feedback control circuit to control inverter voltage and current output based on a difference between the measured real and reactive powers and desired real and reactive powers. The regulator circuit can include or can be associated with processing logic that sets the desired levels of real and reactive power.

An exemplary regulator can further include islanding detection logic to detect an islanding condition of the inverter. Exemplary islanding detection exploits the regulator's ability to separately control the real and reactive power output by the inverter. Specifically, the regulator circuit changes the amount of reactive power output by the inverter and determines whether that change shifts the inverter's output frequency. The detection logic can be configured to perform periodic islanding detection, and it can be configured to selectively perform detection operations based on determining whether the inverter is operating in a grid-connected mode.

DETAILED DESCRIPTION OF THE INVENTION

Figure 1A:
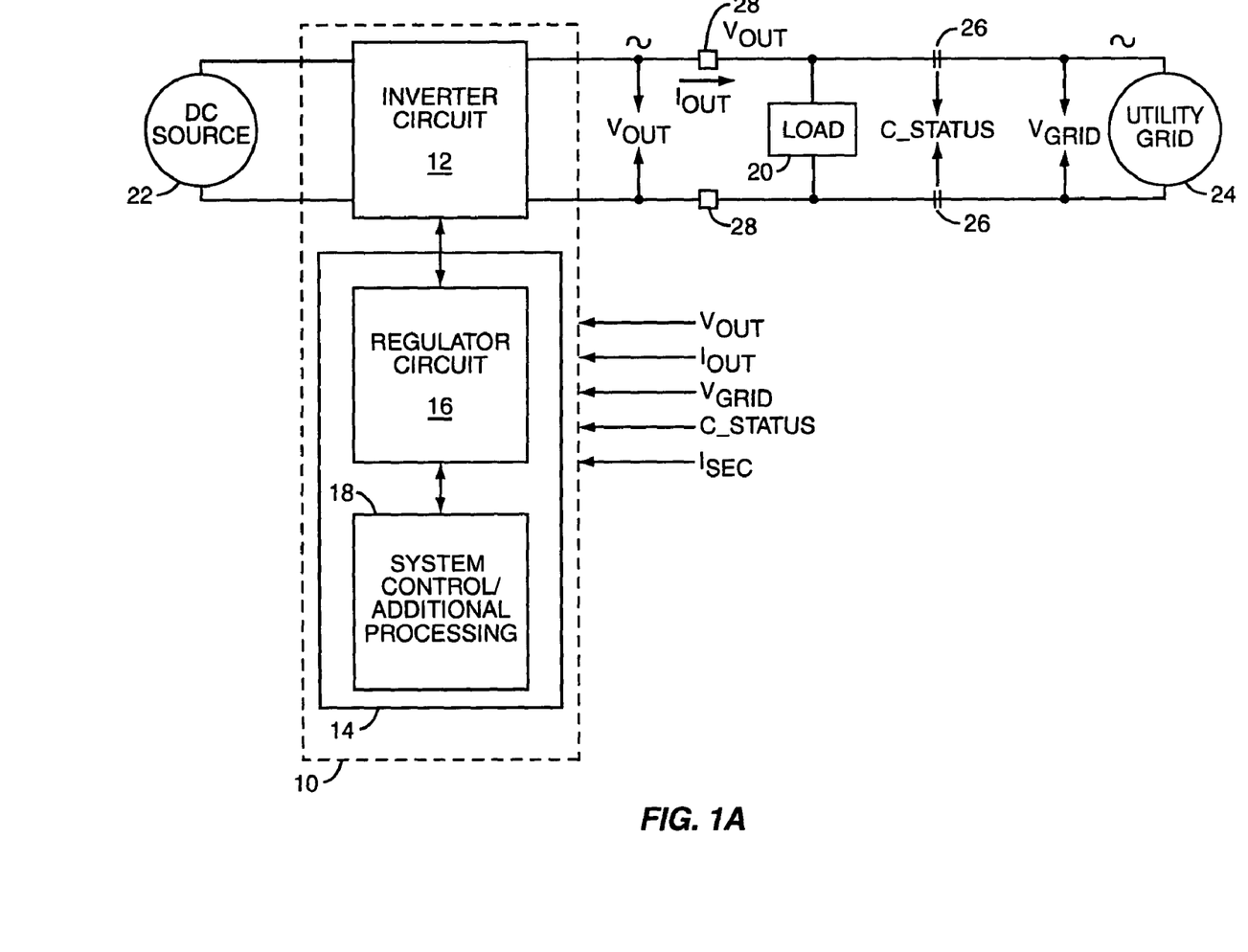
FIGS. 1A, 1B, and 1C are diagrams of an ac power inverter according to one or more exemplary embodiments of the present invention.

FIG. 1A illustrates an exemplary ac power inverter 10 in which the present invention can be practiced. Inverter 10 comprises an inverter circuit 12 and a control circuit 14, which can include multiple functional circuits, including a regulator circuit 16, and one or more additional processing and system control circuits 18.

Inverter 10 provides ac power to a load 20 based on converting dc power provided by a local dc source 22 into ac power at the desired voltage and frequency. The load 20 can be connected in parallel with an external power system 24, e.g., a utility grid, through contactors 26. Complementing its operation in this arrangement, inverter 10 can be configured to receive a number of feedback/detection signals, including signals corresponding to its output voltage ($V_{OUT}$) and current ($I_{OUT}$), the grid voltage ($V_{GRID}$), the contactor status (C_STATUS), and to a secondary winding current ($I_{SEC}$) that is illustrated in FIG. 1B.

Figure 1B:
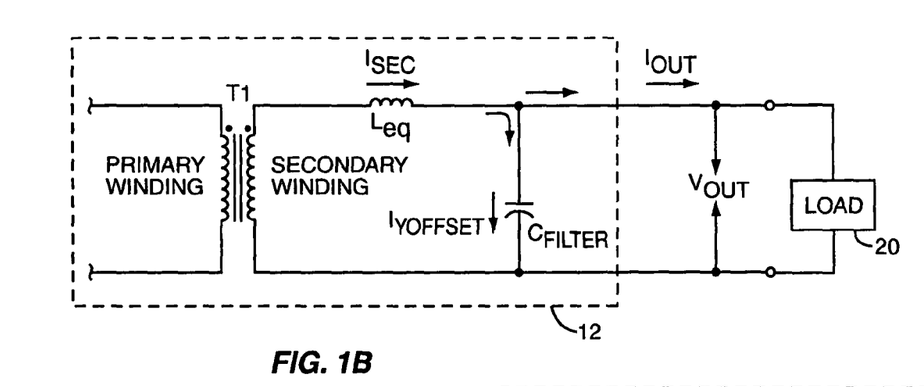

FIG. 1B does not depict the entire inverter circuit 12 but illustrates that an exemplary inverter circuit 12 includes an output transformer T1 comprising primary and secondary windings, and further includes an output filter formed by a filter inductor, $L_{eq}$, and a filter capacitor, $C_{FILTER}$. The filter inductance can be a separate element (component), or can be the leakage inductance of transformer T1. Use of the output filter attenuates the higher frequency components in the inverter's output that naturally arise from Pulse Width Modulation (PWM) based or other switching based dc-to-ac conversion operations implemented by it. One notes that the secondary current, $I_{SEC}$, comprises the inverter output current, $I_{OUT}$, plus the filter current, i.e., the portion of the secondary winding current diverted through $C_{FILTER}$.

Both $I_{SEC}$ and $I_{OUT}$ can be sensed using Current Transformers (CT's) 28 or other types of current measurement sensors. Regardless of how it is sensed, $I_{OUT}$ indicates current flowing into or out of the inverter 10. Note that $I_{OUT}$ can be sensed inferentially, such as by measuring the secondary winding current of transformer T1 rather than directly measuring it using current transformers (CTs) 28.

Figure 1C:
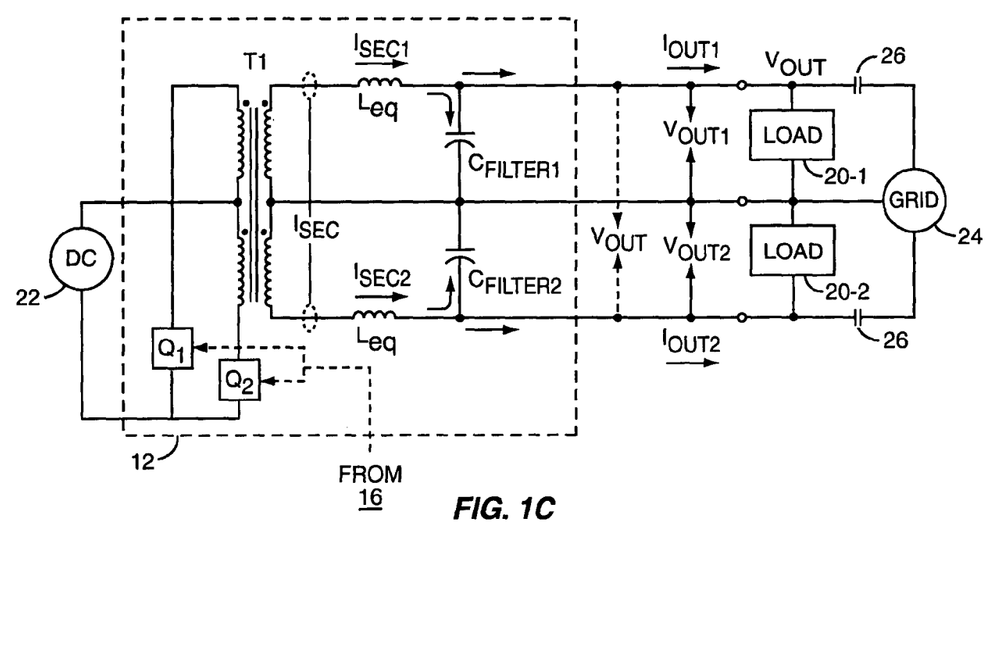

FIG. 1C illustrates an exemplary embodiment configured for three-wire (two line-to-neutral pairs) as typically is used in "service entrance" connections between local loads 20-1 and 20-2 and the grid 24 in the United States, for example. The output transformer T1 comprises split primary and secondary windings, with the neutral wire electrically connected to the center tap of the secondary winding such that one half of the transformer's secondary winding provides $I_{OUT1}$ and $V_{OUT1}$ to load 20-1, and the other half provides $I_{OUT2}$ and $V_{OUT2}$ to load 20-2. Thus, with this configuration, inverter 10 effectively provides two output phases, although the phase voltage in one phase tracks the other and both loads 20-1 and 20-2 see the same line-to-neutral voltage levels.

Secondary winding current comprises $I_{SEC1}$ Plus $I_{SEC2}$ and, likewise, the inverter's output current $I_{OUT}$ comprises $I_{OUT1}$ Plus $I_{OUT2}$, and its output voltage, $V_{OUT}$ comprises $V_{OUT1}$ plus $V_{OUT2}$. Thus, even where inverter 10 is configured for a three-wire output circuit as shown, the overall control method can be based on the total currents and voltages taken across the two phases and the overall inverter control effectively operates as a single-phase control. That is, inverter 10 can base its regulation control on the summation of currents and voltages in the two phases. With that method, the total current and voltage is controlled according to exemplary methods described herein, and the differences between loads 20-1 and 20-2 determine how the total current splits between the phases.

When operating in grid-connected mode (assuming that the grid's voltage and frequency are within nominal ranges) inverter 10 controls its output to match the grid 24. In an exemplary overall control method, inverter 10 controls or regulates its output voltage waveform ($V_{OUT}$) to match the amplitude and phase of the grid voltage, which amounts to tracking and matching the grid's voltage and frequency. Inverter 10 thus can monitor line voltage and frequency and use them to maintain its output. Of course, if inverter 10 detects out-of-range grid conditions, it can open contactors 26 and operate in stand-alone mode until it detects that nominal grid conditions have been restored.

Inverter 10 embodies an advantageous output control method that is based on separate control of the real and reactive power output by inverter 10. In an exemplary embodiment, which can be implemented almost entirely in the digital domain, inverter 10 calculates its real and reactive output power based on calculating x-y phasors for its output voltage and current waveforms, which can be digitized. It generates an inverter control signal, e.g., a PWM-based switching control signal for inverter circuit 12, to adjust the inverter's output based on the differences between measured real and reactive power and desired values for real and reactive power.

In stand-alone mode, the voltage waveform can be regulated as needed or desired and the power draw is determined by the load, but in grid-connected mode, the desired values can be referenced to the grid and adjusted for the desired net power flow between the inverter 10 and the grid 24. To that end, inverter 10 can receive a feedback or other measurement signal from a sensor measuring net power flow at a service entrance or other point of interconnection between the inverter 10 and the grid 24. Inverter 10 can thus be configured to sense whether it is injecting power into the grid 24 or drawing power from it.

Figure 2A:
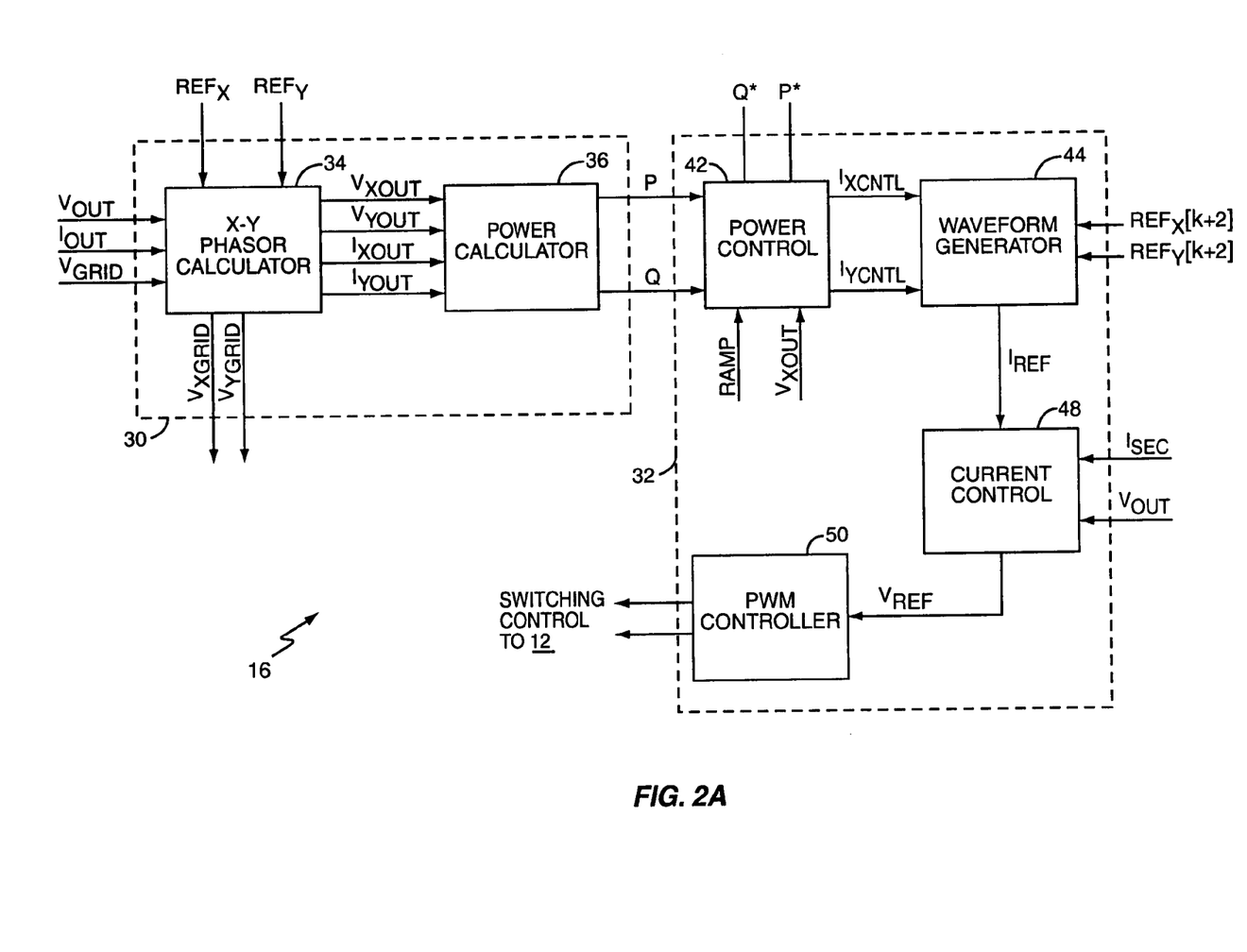
FIGS. 2A and 2B are diagrams of exemplary phasor-based inverter regulator circuits.

FIG. 2A illustrates an exemplary regulator circuit 16, which can be configured to control inverter 10 based on real and reactive power control as described above. In an exemplary embodiment, regulation of the inverter's output comprises an outer control loop driven by differences in measured and desired values of real and reactive inverter power output, and an inner loop driven by control inputs generated by the outer loop, and by voltage and current feedback from the inverter.

More particular, an exemplary regulator 16 generates current commands ($I_{XCNTL}$ and $I_{YCNTL}$) based on the differences between measured and desired real and reactive power and from them generates a reference current waveform, $I_{REF}$. The $I_{REF}$ signal, which can be generated in terms of x and y components, is then used to set a reference voltage, $V_{REF}$, that is updated via the control to produce desired changes in the inverter current. These exemplary control processes are detailed below.

An exemplary regulator 16 comprises a measurement circuit 30 and a feedback control circuit 32. The exemplary measurement circuit 30 includes a phasor calculator 34 and a power calculator 36. The exemplary feedback control circuit 32 includes a power controller 42, a waveform generator 44, current controller 48, and an inverter circuit switching controller 50, e.g. a PWM signal generator.

Figure 2B:
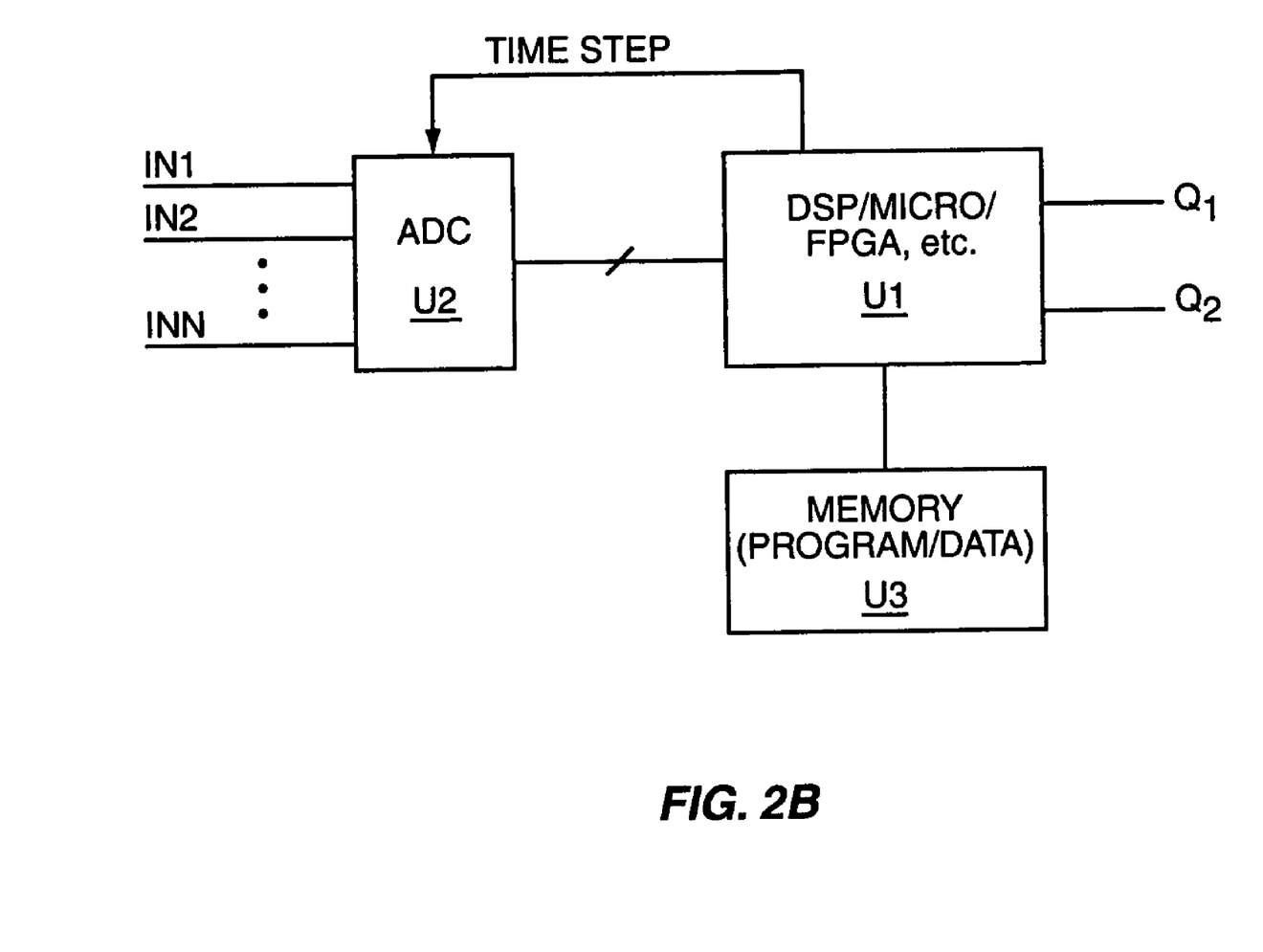

FIG. 2B illustrates an exemplary digital signal processing embodiment for control circuit 14, including one or more integrated circuits, a processor U1, analog-to-digital converter(s) U2, and program/data memory device(s) U3. Thus, regulator circuit 16 can be embodied in whole or in part as a computer program (software, firmware, or microcode, etc.) executing on a digital signal processor (DSP) such as a TMS320C24x series DSP from Texas Instruments.

Of course, it should be understood that a processor-based implementation of regulator 16 is not limiting and its functionality can be embodied in software, hardware, or any combination thereof. The ADCs can be used to move input signals between the analog and digital domains as needed or desired. Discrete (switch) outputs from processor U1 can be used to control the inverter circuit 12 as desired.

Regardless of the particular implementation details, the exemplary phasor calculator 34 generates x-y phasors for feedback signals corresponding to the inverter's output voltage and current waveforms and, in grid-connected operation, for the grid voltage. Reference signals $REF_X$ and $REF_Y$, which can be digital sinusoidal waveforms that can be generated by a phase locked loop (PLL) locked to the mains voltage, establish the x-y coordinate frame used by phasor calculator 34. $REF_X$ establishes the in-phase (x) coordinate frame axis and $REF_Y$ establishes the quadrature (y) coordinate frame axis. In an exemplary embodiment, $REF_X$ and $REF_y$ are referenced to the grid voltage, which is deemed to have zero phase, i.e., the grid voltage establishes the in-phase (x) reference point for the x-y coordinate frame. In stand-alone mode, the x-y reference frame is based on internal timing established by frequency/phase locking circuits included in control circuit 14.

Phasor calculator 34 can be particularly adapted for the calculation of phasor components in single-phase inverter configurations. A sinusoidal voltage waveform can be represented by the equation, $$v(t)=V\cos(\omega t+\phi)=Re\{Ve^{j\omega t}\}. \quad (1)$$

One can represent the phasor amplitude V as a complex number expressed as a magnitude and phase, or as real and imaginary parts, as follows, $$V=V_x+jV_y \text{ or } V=|V|e^{j\phi}=V_x+jV_y, \quad (2)$$

where x and y phasor values for V can be determined as, $$V_x=|V|\cos(\phi), \text{ and} \quad (3)$$

$$V_y=|V|\sin(\phi). \quad (4)$$

In single-phase applications, phasor-calculator 34 averages over half-cycles of the fundamental waveform period to obtain correctly computed x-y phasor components for voltage and current waveforms. An exemplary phasor-calculator 34 can be configured to perform such integration by averaging over an integer number of half-cycles.

Figures 5, 6, 7:
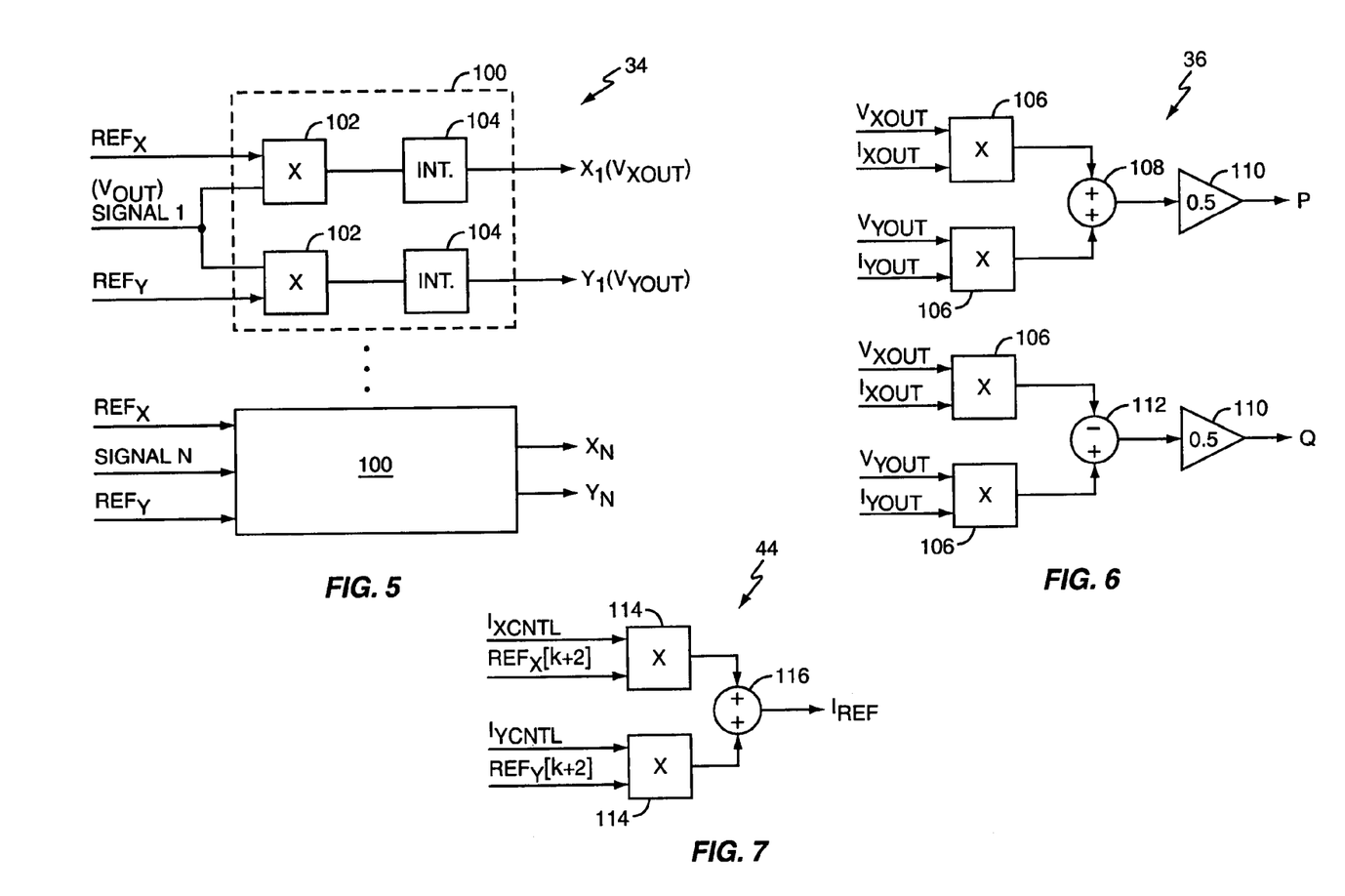
FIG. 5 is a diagram of an exemplary phasor calculator.
FIG. 6 is a diagram of an exemplary phasor-based power calculator.
FIG. 7 is a diagram of an exemplary phasor-to-ac waveform generator.

FIG. 5 illustrates an exemplary configuration for phasor calculator 34 that includes a calculation circuit 100 for each input signal being processed by phasor calculator 34. Circuit 100 comprises a pair of multipliers 102 that separately multiply the input signal ($V_{OUT}$, $V_{GRID}$, or $I_{OUT}$, etc.) by the in-phase and quadrature reference signals, $REF_x$ and $REF_y$. Each multiplier's output feeds into one of the integrators 104, which performs the half-cycle averaging. Thus, phasor calculator 34 generates in-phase and quadrature fundamental components—Fourier components—for the inverter's output voltage and current, and for the grid voltage. Power calculator 36 (FIG. 6) receives the $V_{XOUT}$, $V_{YOUT}$, $I_{XOUT}$, and $I_{YOUT}$ fundamental components for inverter voltage and current, and from them computes the fundamental real and reactive power being output by inverter 10 based on summing selected product terms. With the x-y phasor components for voltage and current, the inverter's real power can be determined by, $$P=\frac{1}{2}Re\{V_A I_A^*\}=\frac{1}{2}(V_{XA}I_{XA}+V_{YA}I_{YA}), \quad (5)$$

where * represents the complex conjugate, and reactive power can be determined as, $$Q=\frac{1}{2}Im\{V_A I_A^*\}=\frac{1}{2}(V_{YA}I_{XA}-V_{XA}I_{YA}). \quad (6)$$

FIG. 6 illustrates an exemplary embodiment for power calculator 36 to implement Eqs. (5) and (6) that includes four input multipliers 106 that are paired together with respect to summing circuits 108 and 112, respectively. Summing circuit 108 outputs a signal based on adding $V_{XOUT}I_{XOUT}$ to $V_{YOUT}I_{YOUT}$, which sum is then scaled by one-half in a first gain circuit 110 to produce the real power measurement value P (Watts). Summing circuit 112 outputs a signal based on subtracting $V_{XOUT}I_{YOUT}$ from $V_{YOUT}I_{XOUT}$, which result is then scaled by one-half in a second gain circuit 110 to produce the reactive power measurement Q (Vars).

Power controller 42 (FIG. 3) receives commanded values of real and reactive power, P* and Q*, measured values of real and reactive power, P and Q, and a power command ramp signal [RAMP]. The controller outputs are command values of x-axis ($I_{XCNT1}$) and y-axis ($I_{YCNT1}$) phasor currents.

Figure 3:
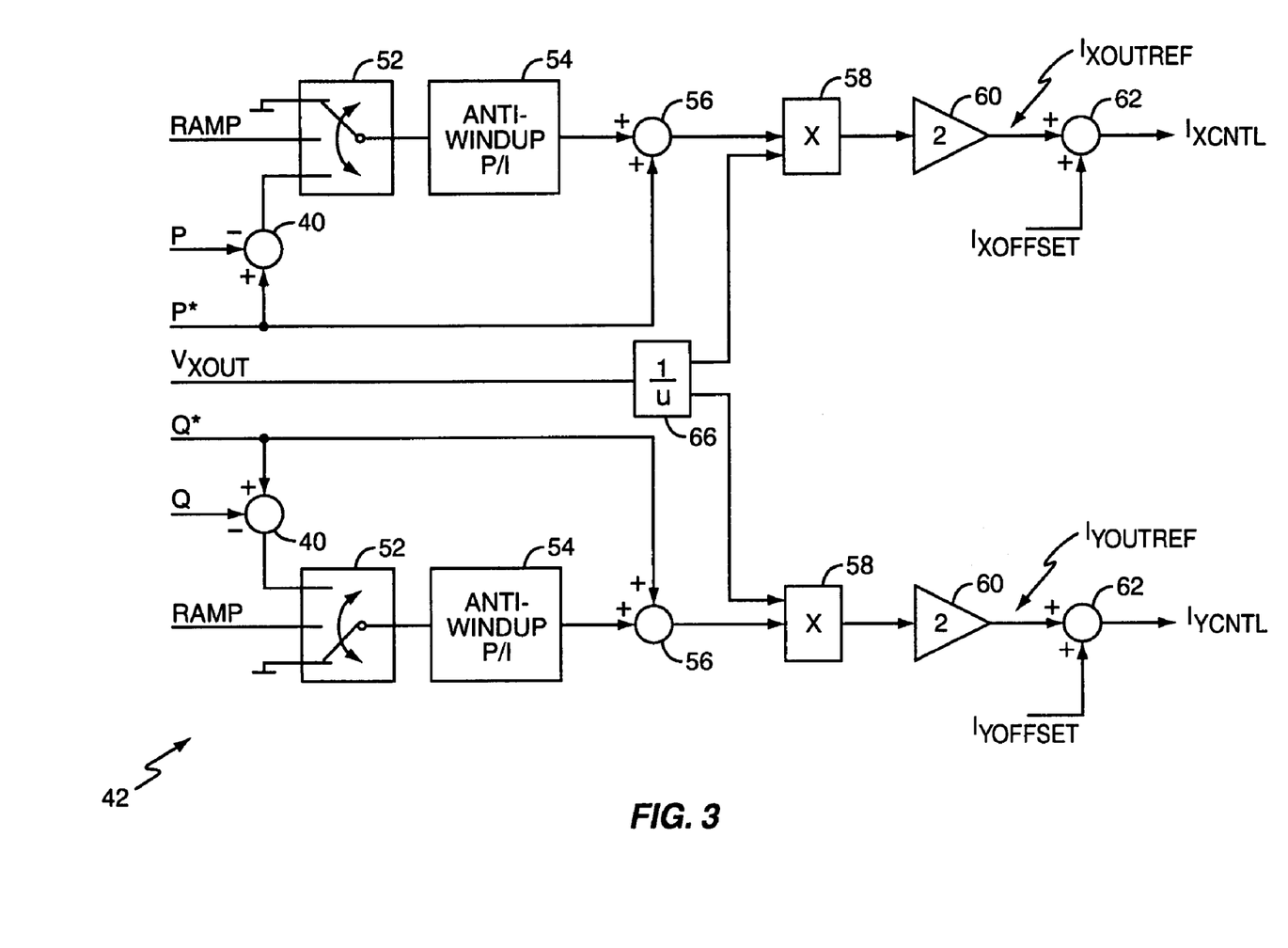
FIG. 3 is a diagram of an exemplary phasor-based power controller.

The controller 42 uses the command values P* and Q* themselves as feedforward command signals. In addition, the controller 42 computes the error between the desired and measured real power, and the desired and measured reactive power. These error signals are input to P+I regulator stages 54, which null out steady state errors in the power control loop. The P+I outputs are summed with the feedforward command values at summing junctions 56. The resulting signals, which have units of power, are divided by the magnitude of the terminal voltage to yield the command values of x-axis ($I_{XOUTREF}$) and y-axis ($I_{YOUTREF}$) phasor currents.

The RAMP signal is a Boolean variable that is asserted when the command values P* and Q* are changing. When the values of P* and Q* are constant, the RAMP signal is low and the error signals are input to the P+I regulators 54. The P+I regulators 54 act to reduce the steady state errors to zero. Asserting the RAMP signal during changing values of P* and Q* causes the switch 52 to toggle, placing a zero at the input to the P+I regulators 54. This action effectively disables the P+I regulators 54 during changes in the command values and prevents integrator windup.

FIG. 3 illustrates an exemplary embodiment of power controller 42, which comprises substantially identical first and second power control signal paths including first and second switches 52, first and second anti-windup Proportional-integral (P/I) controllers 54, first and second summing circuits 56, first and second multipliers 58, and first and second gain circuits 60. Both signal paths further include summing circuit 62, and both paths share a 1/u multiplier 66 that provides the inverse value of $V_{XOUT}$ to the first and second multipliers 58.

In looking at the real power control signal path, the first switch 52, controlled by the ramp signal RAMP, provides the first P/I controller 54 with either a zero (default) signal, or the real power error signal (P–P*). The first P/I controller 54 provides its output signal to the first summing circuit 56, which sums the P/I signal with the desired real power signal P*. That sum feeds into the first multiplier 58, where it is multiplied by $1/V_{XOUT}$. The product is scaled by the first gain circuit 60 to generate a dc domain current $I_{XOUTREF}$ that is summed in a first summing circuit 62 with a signal termed $I_{XOFFSET}$ to form a control signal, $I_{XCNTL}$. The signal $I_{XCNTL}$ corresponds to the in-phase inverter output current needed to reduce the difference between the measured and desired real power.

The $I_{XOFFSET}$ signal can be generated by multiplying $V_{XOUT}$ by known admittance values representing, e.g., capacitor and fan loads. Thus, $I_{XOFFSET}$ can be generated as compensation for no-load currents of inverter 10 according to $I_{XOFFSET}=Y_X V_{XOUT}$, where $Y_X$ represents an admittance value. Alternatively, $I_{XOFFSET}$ can be set to a fixed value based on expected voltage and admittance values.

Similar processing is used for the reactive power, and results in generation of the $I_{YCNTL}$ current control signal corresponding to the quadrature inverter output current needed to reduce the difference between the measured and desired reactive power. As with the x-component, $I_{YCNTL}$ can be compensated or otherwise adjusted using an $I_{YOFFSET}$ signal calculated like the $I_{XOFFSET}$ signal but using y-components.

The substantially dc in-phase and quadrature current control signals, $I_{XCNTL}$ and $I_{YCNTL}$, feed into waveform generator 44, which use time-step advanced versions of the $REF_X$ and $REF_Y$ signals to convert them into a combined ac waveform, $I_{REF}$, representing the desired instantaneous value of inverter output current, $I_{OUT}$, desired for inverter 10.

FIG. 7 illustrates an exemplary embodiment of waveform generator 44, which comprises first and second input multipliers 114, and an output summing circuit 116 to provide $I_{REF}$. The first multiplier 114 multiplies $I_{XCNTL}$ by the $REF_X$ waveform and the second multiplier performs the same operation on $I_{YCNTL}$ but uses the $REF_Y$ waveform. Generator 44 thus generates in-phase and quadrature (sinusoidal) waveforms corresponding to desired in-phase and quadrature components of the inverter's output current $I_{OUT}$ and sums them to provide $I_{REF}$.

Figure 4A:
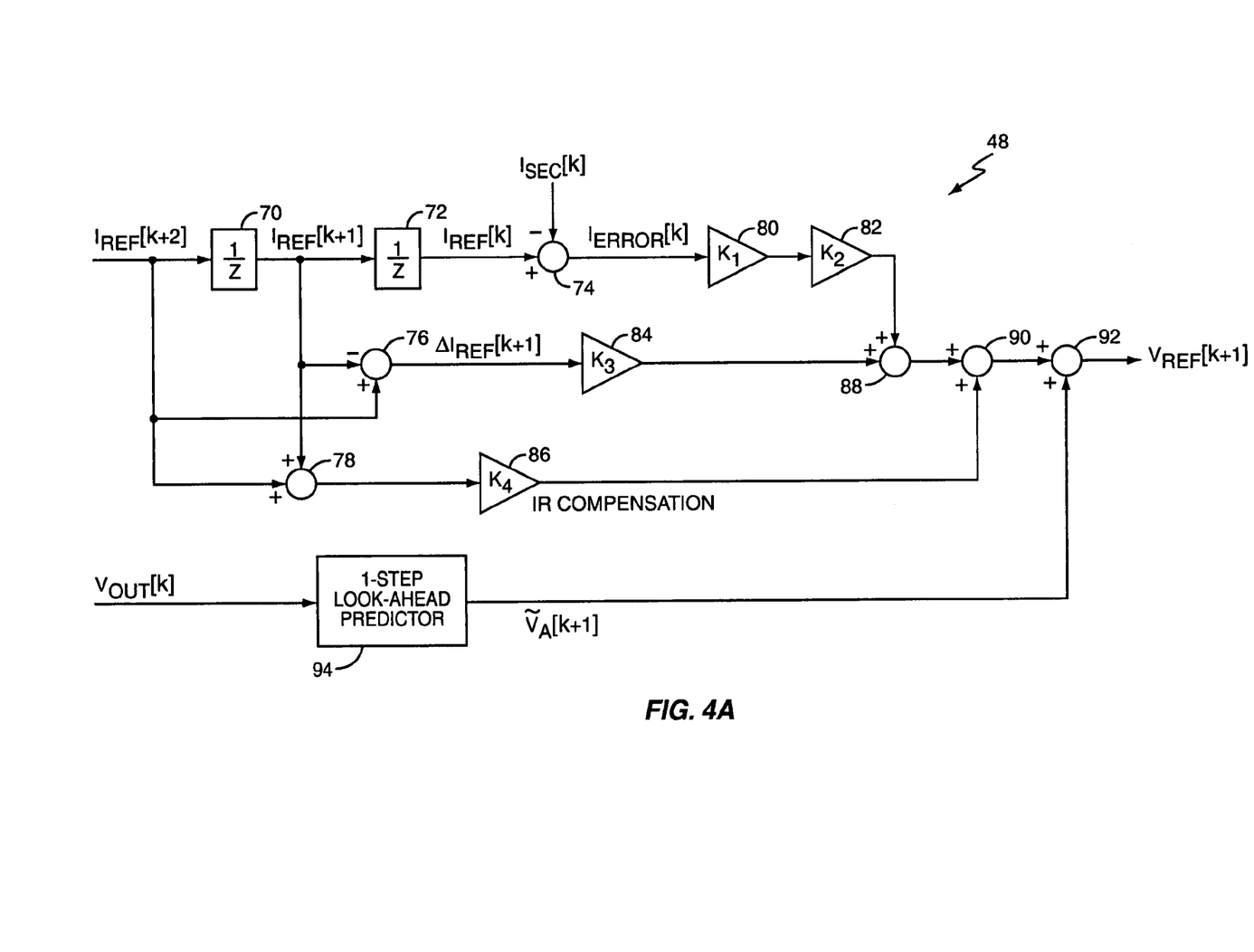
FIG. 4A is a diagram of an exemplary current controller.

Current controller 48 receives $I_{REF}[k+2]$ as a control input, and receives $I_{SEC}[K]$ and $V_{OUT}$ as feedback signals. FIG. 4A illustrates an exemplary current controller 48, which comprises delay circuits 70 and 72, summing circuits 74, 76, and 78, gain circuits 80, 82, 84, and 86, summing circuits 88, 90, and 92, and look-ahead circuit 94.

Together, these circuits provide an inverter control signal $V_{REF}$, which controls the output from inverter circuit 12. The control input signal $I_{REF}[k+2]$ is already advanced by 2 time steps at the point where it is generated by waveform generator 44. The delay circuits 70 and 72 for $I_{REF}$ generate two additional versions of the control signal $I_{REF}[k+1]$ and $I_{REF}[k]$, advanced by 1 time step and zero time steps, respectively. Summing circuit 76 generates a difference signal $\Delta I_{REF}[k+1]$, representing the anticipated change in the $I_{REF}$ control input over the next time interval. Gain circuit 84 converts the anticipated current change into a voltage to be applied across the inverter's equivalent series inductance $L_{eq}$, in order to drive the anticipated current change.

In addition to the anticipated change in the $I_{REF}$ control input, there will generally be some error $I_{ERROR}[k]$ between the desired current value $I_{REF}[k]$ and the actual (measured) current value $I_{SEC}[k]$. Summing circuit 74 measures the current error $I_{ERROR}[k]$, and gain circuits 80 and 82 convert the current error into a voltage correction to be applied to the series inductance $L_{eq}$ to correct for the error. Summing circuit 78 and gain circuit 86 serve to calculate an additional correction for voltage drops due to the inverter's equivalent series resistance. Summing circuits 88 and 90 serve to add the two correction signals to the original voltage calculation from gain circuit 84, to yield a total voltage to be applied across $L_{eq}$.

Look-ahead circuit 94 generates a prediction of the inverter output voltage $V_{OUT}$ at the next time step, using a linear predictor that is optimized for sinusoidal voltage signals. Summing circuit 92 then adds the predicted output voltage to the required voltage across $L_{eq}$, to yield a voltage command $V_{REF}[k+1]$ to be applied to the inverter during the next time step.

Figure 4B:
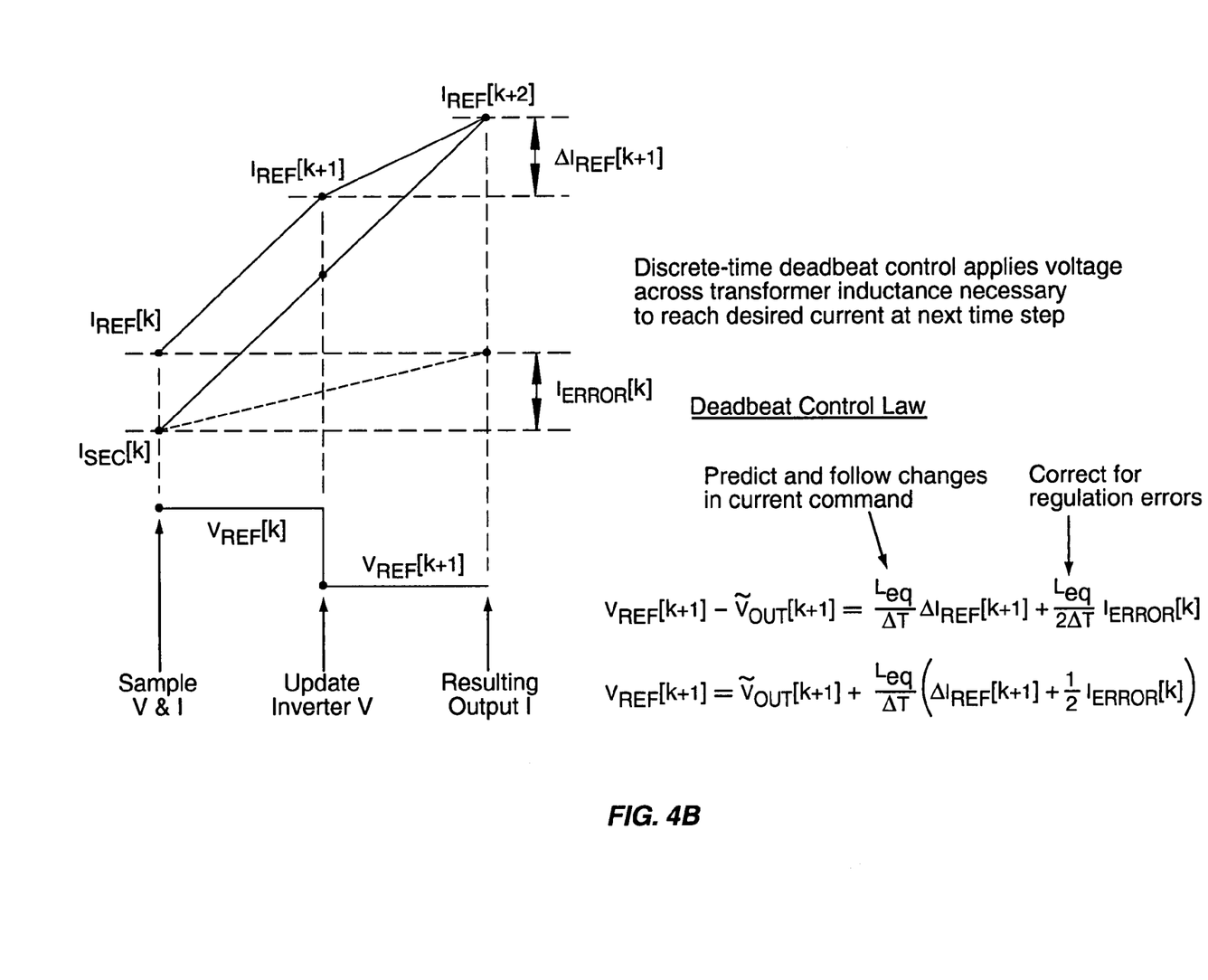
FIG. 4B is a diagram of exemplary control details for the controller of FIG. 4A.

Thus, as detailed above, and as graphically depicted in FIG. 4B, exemplary control law delays provided by current controller 48 account for the difference between measuring the inverter's output and commanding a change in that output, i.e., the control loop delay between commanding a change in inverter voltage and measuring the current corresponding to that change. In the illustrated embodiment, the current and voltage measurements performed at sample time k are used to calculate the inverter voltage to be applied at time k+1, which in turn will result in changes in the inverter's output current at time k+2, thus accounting for the two $z^{-1}$ delays in the control path.

Finally, switching controller 50 generates inverter switching control signals responsive to the $V_{REF}$ signal output by current controller 48. For the switching network shown in FIG. 1C, an exemplary switching controller can be configured as a PWM signal generator that outputs complementary pulse trains for switching transistor circuits Q1 and Q2 on and off according to pulse width timing determined from $V_{REF}$.

Thus, the inverter's output is matched to the required (or desired) magnitude, frequency, and phase not by directly setting current and voltage phases and magnitudes but rather by referencing the inverter's x-y coordinate frame to a desired anchor point, e.g., the grid voltage, and controlling the real and reactive powers measured for the inverter in relation to desired real and reactive powers. That method has the added advantage of transforming most control variables into substantially dc values and enables relatively straightforward phasor-based control law calculations.

Reliable islanding detection is among the many advantages accruing from the ability to accurately control real and reactive power. With grid-connected operation, the possibility exists that a portion of the grid 24 connected to the inverter 10 will become isolated from the rest of grid 24, e.g., the "service hookup" and associated local feeder lines that provide power from the grid 24 to load 20. Under such conditions, inverter 10 can keep the islanded portion of grid 24 energized, creating a potentially hazardous condition for service personnel and anyone else that is unaware of the island's energized condition.

If the load's local feeder lines are connected to the grid 24 and grid 24 is operating within nominal conditions, changes in the inverter's output affect power quality and net power flow between the inverter 10 and the grid 24, but those changes do not disturb the grid's line frequency and voltage. From the inverter's perspective, grid 24 looks like a very stiff voltage source that essentially cannot be disturbed by variations in the inverter's output. However, that is not true when the load's local feeder lines become disconnected from the grid 24.

In particular, when the load's local feeder lines are connected to the grid 24, changes in the reactive power output by the inverter 10 change the power factor associated with inverter 10 but do not change the line frequency. If the feeder lines become isolated, such that they and the load are driven only by the inverter 10, changing the inverters reactive power output shifts the inverter's output frequency. With independent real and reactive power control, inverter 10 thus can be configured to detect islanding by changing its reactive power output and monitoring for any resulting change in frequency.

Figure 8:
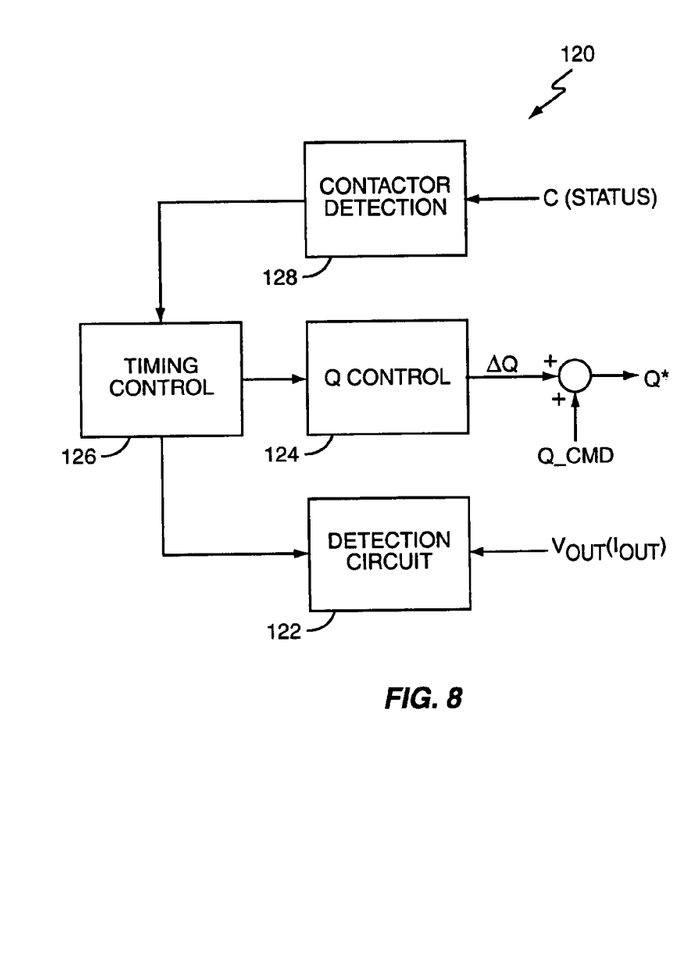
FIG. 8 is a diagram of exemplary islanding detection logic.
Figure 9:
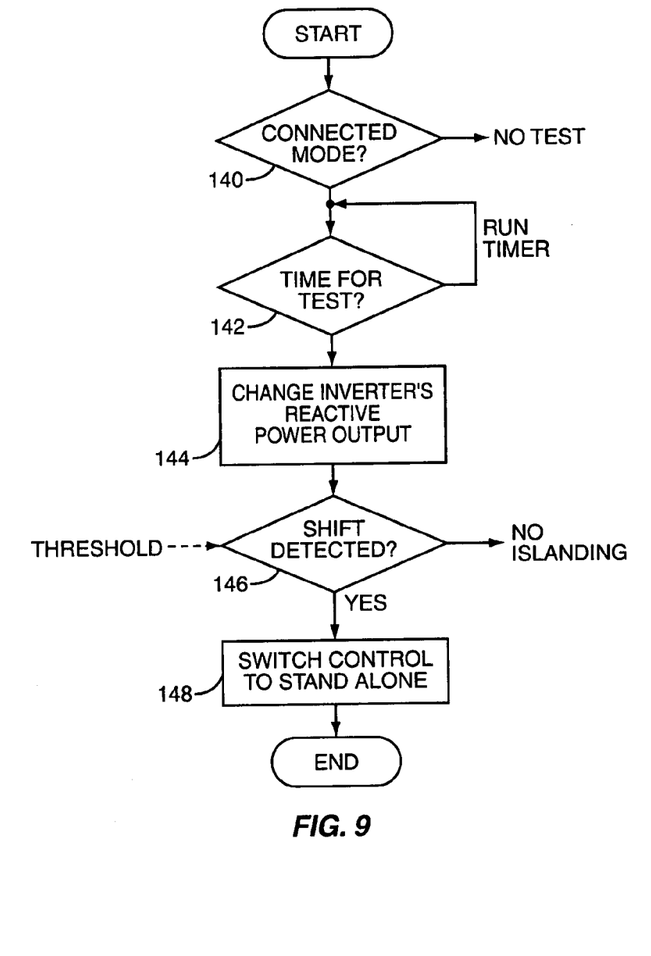
FIG. 9 is a diagram of exemplary islanding detection operations.

FIG. 8 illustrates islanding detection logic 120 that can be included in control circuit 14, such as in regulator 16. Exemplary logic 120 comprises a detection circuit 122, a reactive power adjustment circuit 124, a timing controller 126, and a status circuit 128. FIG. 9 illustrates exemplary operations that can be embodied in computer program instructions executing on a microprocessor (DSP, etc.), but it should be understood that the illustrated operations can be implemented in discrete logic and can be varied as needed or desired.

Processing begins with status circuit 128 determining whether contactors 26 are closed (Step 140). If the contactors 26 are not closed, the inverter 10 is operating in stand-alone mode and islanding detection is not required. If the contactors 26 are closed, islanding detection processing continues with a determination of whether a test interval has expired. Because the inverter 10 typically is configured to set its reactive power output to zero (all real power), or to whatever value is needed to compensate the load's impedance to maintain a desired power factor, it can be desirable to run islanding detection on a periodic basis where the reactive output power is perturbed briefly at regular intervals.

Thus, circuit 120 can wait until expiration of a test timer (Step 142) before proceeding with islanding detection operations. Timing control circuit 126 can provide test-timing functions and can run or not run responsive to the detected contactor status. In any case, circuit 120 changes the reactive power output by inverter 10 upon expiration of the timer (Step 144) and monitors for a change in frequency (Step 146).

The reactive power control circuit 124 can change the output reactive power by modifying a value, Q_CMD, corresponding a nominal desired reactive power by a delta amount, ΔQ, to adjust the previously described reactive power command value Q*. Thus, when islanding detection is active, ΔQ is a non-zero value used to shift the value of the desired reactive power and is zero when the test is inactive. Of course, other methods can be used to change reactive power, such as by changing, e.g., rotating, the x-y reference frame, etc.

Threshold information can be used to qualify the magnitude of the detected shift. If no shift is detected, the inverter 10 determines that it is not islanded and normal grid-connected output control operations continue. If a frequency shift is detected, the inverter 10 determines that it is islanded and commands contactors 26 to open, thereby disconnecting inverter 10 and load 20 from the grid's feeder lines (Step 148). This action shifts the inverter 10 to stand-alone mode, although it can monitor for a return of nominal grid voltage as a trigger for changing back to grid-connected mode.

When operating in stand-alone mode, control circuit 14 changes the reference for the x-y coordinate frame from the grid voltage to an internally generated reference framework. Thus, the x and y axes of the coordinate frame can be selectively established by an internal in-phase and quadrature reference circuit, or by the grid's frequency and phase. The ability to set the reference for the x-y coordinate frame on either internal or external references enables the x-y based control scheme to operate in either grid-connected or stand-alone modes, and to smoothly change between modes.

Broadly, the present invention provides an exemplary method and apparatus for controlling a power inverter in the x-y phasor domain based on the real and reactive power output by the inverter. The implementation details can be varied as needed or desired without departing from the scope of the present invention, and it should be understood that the foregoing discussion of exemplary embodiments is not limiting. Indeed, the present invention is limited only by the following claims and their reasonable equivalents.

What is claimed is:

1. A method of controlling a power inverter comprising:
   calculating x-y phasor components of inverter output current and voltage referenced to a desired x-y coordinate frame;
   measuring real and reactive power output by the inverter based on the calculated x-y phasor components; and
   adjusting the inverter output current and voltage to reduce a difference between the measured real and reactive powers and desired real and reactive powers.

2. The method of claim 1, wherein calculating the x-y phasor components comprises averaging over half-cycles of in-phase and quadrature components of single-phase voltage and current waveforms output by the inverter.

3. The method of claim 2, wherein averaging over half-cycles of in-phase and quadrature components of single-phase voltage and current waveforms output by the inverter comprises averaging over an integer number of half-cycles.

4. The method of claim 2, further comprising generating the in-phase and quadrature components by multiplying feedback signals corresponding to the inverter output voltage and current by in-phase (x) and quadrature (y) reference signals.

5. The method of claim 1, wherein calculating x-y phasor components of inverter output current and voltage referenced to a desired x-y coordinate frame comprises:
   multiplying feedback signals corresponding to inverter output voltage and current by in-phase and quadrature reference signals to generate in-phase and quadrature measurement signals; and
   integrating the in-phase and quadrature measurement signals over half-cycles of the inverter output voltage and current.

6. The method of claim 1, wherein measuring real and reactive power output by the inverter based on the calculated x-y phasor components comprises generating and summing selected product terms for in-phase and quadrature combinations of the x-y phasor components.

7. The method of claim 1, wherein adjusting the inverter output current and voltage to reduce a difference between the measured real and reactive power and desired real and reactive power comprises generating x-y control signals corresponding to desired in-phase and quadrature inverter output currents, and controlling the inverter based on the x-y control signals.

8. The method of claim 1, further comprising selectively referencing the x-y coordinate frame to one of an external reference signal and an internal reference signal.

9. The method of claim 8, wherein the inverter is a grid-connected inverter, and wherein selectively referencing the x-y coordinate frame to one of an external reference signal and an internal reference signal comprises referencing the x-y coordinate frame to a grid voltage in a grid-connected mode of operation, and referencing the x-y coordinate frame to an internal reference voltage in a stand-alone mode of operation.

10. The method of claim 9, further comprising changing between grid-connected and stand-alone modes of operation based on detecting whether the grid is operating within nominal ranges for one or more electrical parameters.

11. The method of claim 1, further comprising referencing the x-y coordinate frame to an electrical parameter of a utility grid to which the inverter is connected.

12. The method of claim 11, wherein referencing the x-y coordinate frame to an electrical parameter of a utility grid to which the inverter is connected comprises aligning the x coordinate to a grid voltage such that x phasor components have a zero degree phase angle relative to the grid voltage and y phasor components have a ninety degree phase angle relative to the grid voltage.

13. The method of claim 1, wherein the inverter is a grid-connected inverter configured to operate in parallel with a utility grid, the method further comprising controlling an amount of reactive power output by the inverter to detect an islanding condition.

14. The method of claim 13, wherein controlling an amount of reactive power output by the inverter to detect an islanding condition comprises periodically increasing an amount of reactive power output by the inverter and determining whether the increase causes a shift in inverter output frequency.

15. The method of claim 13, wherein controlling an amount of reactive power output by the inverter to detect an islanding condition comprises periodically changing one or more control values used to set desired reactive power to cause a change in the reactive power output by the inverter, and determining that the inverter is operating in an island condition if an output frequency of the inverter shifts by more than a predetermined amount responsive to the change in reactive power output.

16. The method of claim 13, further comprising disconnecting the inverter from the grid responsive to detecting an islanding condition.

17. A regulator circuit for controlling a power inverter comprising:
    a measurement circuit to measure real and reactive power output by the inverter based on calculating x-y phasor components of inverter output current and voltage referenced to a desired x-y coordinate frame; and
    a feedback control circuit to control inverter voltage and current output based on a difference between the measured real and reactive powers and desired real and reactive powers.

18. The regulator circuit of claim 17, wherein the measurement circuit comprises a phasor calculator to calculate in-phase (x) and quadrature (y) fundament components of inverter output voltage and current, and a power calculator to generate measurements for the real and reactive power output by the inverter based on the fundamental components.

19. The regulator circuit of claim 18, wherein the phasor calculator comprises multipliers to generate in-phase and quadrature measurement signals for the inverter output voltage and current, and integrators to generate the fundamental components by integrating over half-cycles of the measurement signals.

20. The regulator circuit of claim 18, wherein the power calculator comprises product term generators to generate selected product terms of the fundamental components and summing circuits to generate measurements of real and reactive power output by the inverter based on the selected product terms.

21. The regulator circuit of claim 17, wherein the measurement circuit comprises one or more single-phase measurement circuits, each configured to measure real and reactive powers output by the inverter on a single-phase inverter output.

22. The regulator circuit of claim 17, wherein the feedback control circuit is configured to control inverter voltage and current output by generating x-y control signals corresponding to desired in-phase and quadrature inverter output currents, and controlling the inverter based on the x-y control signals.

23. The regulator circuit of claim 17, wherein the regulator circuit includes one or more reference signal inputs to receive x-y reference signals that define the desired x-y coordinate frame.

24. The regulator circuit of claim 17, further comprising detection logic to detect an islanding condition of the inverter based on detecting whether changing an amount of reactive power output by the inverter shifts an output frequency of the inverter.

25. A computer readable medium storing a computer program comprising:
    program instructions to calculate x-y phasors for output voltage and output current from a power inverter configured to provide ac power;
    program instructions to measure real and reactive power output by the inverter based on the x-y phasors;
    program instructions to receive desired values for real and reactive power and to generate x-y control signals to control real and reactive power output by the inverter based on the measured real and reactive power and the desired values for real and reactive power.

26. The computer readable medium of claim 25, wherein the computer program further comprises program instructions to align an x-y coordinate frame used to generate the x-y phasors to a sensed grid voltage of a utility grid to which the inverter is connected.

27. The computer readable medium of claim 25, wherein the computer program further comprises program instructions to detect an islanding condition of the inverter by determining whether changing an amount of reactive power output by the inverter shifts an output frequency of the inverter.

28. The computer readable medium of claim 27, wherein the computer program instructions to detect an islanding condition of the inverter comprise program instructions to periodically change the amount of reactive power output by the inverter and monitor for a coincident change in frequency of the output voltage of the inverter.

29. A power inverter comprising:
    an inverter circuit to output ac power;
    a regulator circuit to control real and reactive power output by the inverter circuit, the regulator circuit comprising:
        a measurement circuit to measure real and reactive power output by the inverter circuit based on calculating x-y phasor components for voltage and current waveforms output by the inverter circuit; and
        a control circuit to control the real and reactive power output by the inverter circuit based on measured and desired real and reactive powers.

30. The power inverter of claim 29, wherein the regulator circuit further comprises a reference signal generator to generate in-phase and quadrature reference signals that establish an x-y coordinate frame for calculating the x-y phasor components.

31. The power inverter of claim 30, wherein, for a grid-connected configuration of the power inverter, the regulator circuit is configured to reference the x-y coordinate frame to a utility grid voltage phase.

32. The power inverter of claim 29, wherein the measurement circuit comprises phasor calculators configured to generate the x-y phasors by averaging over half-cycles of the voltage and current waveforms.

33. The power inverter of claim 29, wherein the power inverter further comprises islanding detection logic to detect an islanding condition of the power inverter based on determining whether an output frequency of the power inverter changes responsive to changing an amount of reactive power output by the inverter circuit.

34. The power inverter of claim 33, wherein the islanding detection logic is configured to periodically check for the islanding condition if the power converter is connected to a utility grid.

35. The power inverter of claim 34, wherein the power inverter further comprises one or more signal inputs and associated logic to detect whether the power inverter is connected to a utility grid.

36. The power inverter of claim 33, wherein the power inverter further comprises one or more signal outputs configured to output one or more disconnect signals responsive to detecting an islanding condition.

* * * * *